United States Patent [19]
Fisk, Jr. et al.

[11] Patent Number: 5,415,230
[45] Date of Patent: May 16, 1995

[54] METHOD AND COMBINATION FOR MATERIALS FOR RELEASING A STUCK PIPE

[75] Inventors: James V. Fisk, Jr., Houston; Jeffrey P. Kirsner, Friendswood, both of Tex.

[73] Assignee: Baroid Technology, Inc., Houston, Tex.

[21] Appl. No.: 184,427

[22] Filed: Jan. 21, 1994

[51] Int. Cl.⁶ ............... C09K 7/02; E21B 31/03
[52] U.S. Cl. ................... 166/301; 507/940; 507/200; 507/272; 507/277; 507/269
[58] Field of Search ............... 166/301, 98, 99; 252/8.551; 507/136, 126, 138, 140

[56] References Cited

U.S. PATENT DOCUMENTS

| | | | |
|---|---|---|---|
| 4,494,610 | 1/1985 | Walker | 166/301 |
| 4,614,235 | 9/1986 | Keener et al. | 166/301 |
| 4,876,017 | 10/1989 | Trahan et al. | 166/301 X |
| 4,964,615 | 10/1990 | Mueller et al. | 252/8.551 |
| 5,002,672 | 3/1991 | Hayes et al. | 252/8.513 |
| 5,057,234 | 10/1991 | Bland et al. | 166/301 X |
| 5,120,708 | 6/1992 | Melear et al. | 507/126 |
| 5,141,920 | 8/1992 | Bland et al. | 507/136 |
| 5,247,992 | 9/1993 | Lockhart et al. | 166/301 |
| 5,260,268 | 11/1993 | Forsberg et al. | 166/301 X |

Primary Examiner—Stephen J. Novosad
Attorney, Agent, or Firm—Browning, Bushman, Anderson & Brookhart

[57] ABSTRACT

A method and combination of materials for freeing stuck pipe involves first the spotting of a clear brine, preferably calcium chloride, calcium bromide or zinc bromide, or mixtures thereof, for a given period of time, preferably at least about 8 hours, in the stuck region of the pipe, followed by the spotting of a spotting agent selected from wetting agents, surfactants, lubricants, or mixtures thereof, in the stuck region of the pipe.

11 Claims, 4 Drawing Sheets

METHOD AND COMBINATION FOR MATERIALS FOR RELEASING A STUCK PIPE

BACKGROUND OF THE INVENTION

This invention relates to a method and to a combination of materials for facilitating the release of a stuck pipe, particularly a differentially stuck pipe.

Stuck pipe may be defined as drill pipe, drill collars, drill bits, stabilizers, reamers, casing, tubing, measurement while drilling tools, logging tools, etc., having inadvertently become immovable in a well bore. The term "stuck pipe" is used in the industry as a convenient compendious term to cover the sticking of all such equipment and is generally understood as not being restricted literally to pipes. Sticking may occur when drilling is in progress, when pipe and casing is being run in the hole or when a drill pipe is being hoisted.

There are numerous causes of stuck pipe; some occur regularly, some may be peculiar to a particular area and some may be unique. Industry convention categorizes the causes as either differential or mechanical sticking.

Differential sticking is believed to occur by the following mechanism. During most drilling operations, the hydrostatic pressure exerted by a drilling mud column is greater than the formation fluid pressure. In permeable formations, mud filtrate flows from the hole into the rock and builds up a filter cake. A pressure differential exists across the filter cake which is equal to the difference between the pressure of the mud column and the pressure of the formation.

When a pipe is central in the bore, the hydrostatic pressure due to the mud overbalance acts in all directions around it. If, however, the pipe touches the filter cake, the mud overbalance acts to push the pipe further into the cake, thus increasing the contact area between the pipe and the cake. Filtrate is still expelled from the filter cake between the pipe and the formation, thus shrinking the cake and allowing the pipe to penetrate further into it and so increasing the contact area still more. If the pressure difference is high enough and acts over a sufficiently large area, the pipe may become stuck.

Differential sticking usually occurs when the pipe has been motionless for a period of time, e.g., when making a connection or during surveying. Differential sticking can be a particular problem when drilling depleted reservoirs because of the associated high overbalance.

The force required to pull differentially stuck pipe free depends, inter alia, upon the following factors:
(a) The difference in pressure between the borehole and the formation. Any overbalance adds to side forces which may exist due to the deviation of the hole.
(b) The surface area of pipe embedded in the wall cake. The thicker the cake or the larger the pipe diameter, the greater this area is likely to be.
(c) The bond developed between the pipe and the wall cake is a very significant factor, being directly proportional to the sticking force. This can include frictional, cohesive and adhesive forces. It tends to increase with time, making it harder to pull the pipe free.

Differential sticking may be distinguished from other forms of sticking, such as mechanical sticking. Mud circulation is not interrupted as there is no obstruction in the hole to stop the flow, as would be the case for pipe stuck due to hole bridging or caving. It is not possible to move or rotate the pipe in any direction.

When a pipe sticks the driller usually tries to free it by mechanical movement, e.g., by pulling, jarring or, if the pipe was moving immediately prior to sticking, trying to move it in the opposite direction. Frequently this fails to release the pipe and there is, of course, a limit to the force which can be applied, since too much force could fracture the pipe and make the situation worse.

If the pipe remains stuck it is then sometimes the practice to apply a pipe release agent.

Pipe release agents are chemically active mixtures, which may be oil or water based, which are placed over the stuck region in an attempt to free the pipe if working the pipe has failed to release it. These are believed to act by attacking the mud filter cake. They are positioned by pumping them down the hole to the stuck region in the form of a slug, known as a pill. The pill generally contains sufficient material to cover the stuck zone and extend slightly beyond it over a total area of 1.5–2 times the area of the stuck zone. The pill volume necessary to achieve this is usually about 100 bbl. Pills frequently are left to soak until the pipe is free or attempts to free the pipe are abandoned.

Pipe release agents are generally sold as proprietary blends by companies trading in this area, frequently without divulging their chemical components. However, some pipe release agents are based on asphaltenic compounds and some on glycols, glycerols, alcohols and fatty acids and derivatives of such compounds. Traditionally, pill density has been increased in a similar manner to muds, using solid particulate weighting agents such as barite, with viscosifiers to prevent settling, to preferably match the density of the spotting fluid to the density of the drilling fluid which had been used up to the time of the pipe being stuck. For example, if the drilling fluid had a density of 14 pounds/gal (ppg), then the spotting fluid would be weighted up, for example, with barite, to result in a spotting fluid density of 14 ppg.

There are many such pipe release agents known in the prior art. In those cases where environmental concerns do not prohibit or discourage their use, diesel oil has been used with a fair amount of success.

For many years, asphalt-based spotting fluids such as the product BLACK MAGIC SFT marketed by Baker-Hughes was also used with a fair amount of success. In those cases where asphalt, diesel oil, mineral oil or other oil-based spotting fluids cannot or should not be used, many other commercially available, environmentally-friendly spotting fluids have been used in an attempt to free stuck pipe, oftentimes, only with limited success.

For example, the use of polyalphaolefin as a lubricant/spotting fluid is disclosed in U.S. Pat. No. 4,876,017 to David O. Trahan, et al., such material being marketed by The Coastal Mud Company under the trade name COASTALUBE.

U.S. Pat. No. 5,002,672 to James R. Hayes, et at. is another example of a more environmentally-friendly spotting fluid (marketed by Turbo-Chem International, Inc. of Lafayette, La.) comprising the use of a glycerophosphoric acid ester and a polyacyloxy polycarboxylic acid ester of mono and/or diglycerides, in combination with other viscosifiers and sealing agents.

U.S. Pat. No. 4,964,615 to Heinz Mueller, et al. discloses yet another spotting fluid using fatty acid alkyl esters or mixtures of esters.

Many other commercially-available spotting fluids are known in the art such as, for example, the COASTAL SPOT spotting fluid (a polyol ester) marketed by the Coastal Mud Company, Abbevile, La., the ENVIRO-SPOT, the PETROFREE Ester and the BARO-SPOT spotting fluids marketing by Baroid Drilling Fluids, Inc. of Houston, Tex., the CESCO A-25 SPOT product marketed by Cesco Chemicals, Inc. of Lafayette, La., the PIPE-LAX product (a glyceride) marketed by M-I Drilling Fluids, Inc. and the VL-250 product (a blend of terpenes-cylic $C_{10}$) marketed by Integrity Industries. The ENVIRO-SPOT product is a blend of emulsifiers, lubricants, gellants and other materials. The BARO-SPOT product is a blend of surfactants, lubricants and viscosifiers. GILSONITE is marketed by Cesco Chemicals, Inc. at Lafayette, La. SURFYNOL 440, a $C_{14}$ Accylene Polyol, is marketed by Air Products, Inc. BXR-2000 is a polyglycol marketed by Baroid Drilling Fluids, Inc. MONA 939 is a phosphate ester marketed by Mona Industries, Inc.

In SPE Paper No. 22550, presented in Dallas, Tex. on Oct. 6-9, 1991, there is the suggestion on its pages 159-160, that a single spot mixture of 40% sodium chloride brine (20 wt % salt) with glycerol (60 vol %) results in rapid pipe release and a cracked filter cake, and concluded that "These results demonstrate that differentially stuck drill pipe can be released with oil-free fluids, providing encouragement that an effective non-oil spotting fluid can be formulated." Also on page 159 of SPE Paper No. 22550, there is a discussion of using a single spot calcium chloride/calcium bromide as a pipe release agent, all as shown further in Table 7 of the paper.

It is also known (the KOPLUS LL material marketed by Gait International of Dublin, Ireland) to use citric acid in combination with organic or inorganic salts (including potassium chloride) to free stuck pipe.

However, each of the available more or less environmentally-safe spotting fluids has had only limited success in freeing stuck pipe.

It is therefore the primary object of the present invention to provide a more reliable method of freeing stuck pipe.

It is another object of the present invention to provide a new and improved combination of materials which can be used to free stuck pipe.

SUMMARY OF THE INVENTION

The invention comprises, in its broader aspects, the spotting first of a weighted, clear brine solution, preferably comprising Calcium Bromide, Calcium Chloride or a blend thereof, for a predetermined period of time, followed by the spotting of a more conventional spotting fluid.

BRIEF DESCRIPTION OF THE DRAWINGS

Other features and intended advantages of the invention will be more readily apparent by reference to the following detailed description in connection with the accompanying drawings wherein.

Figure 1:
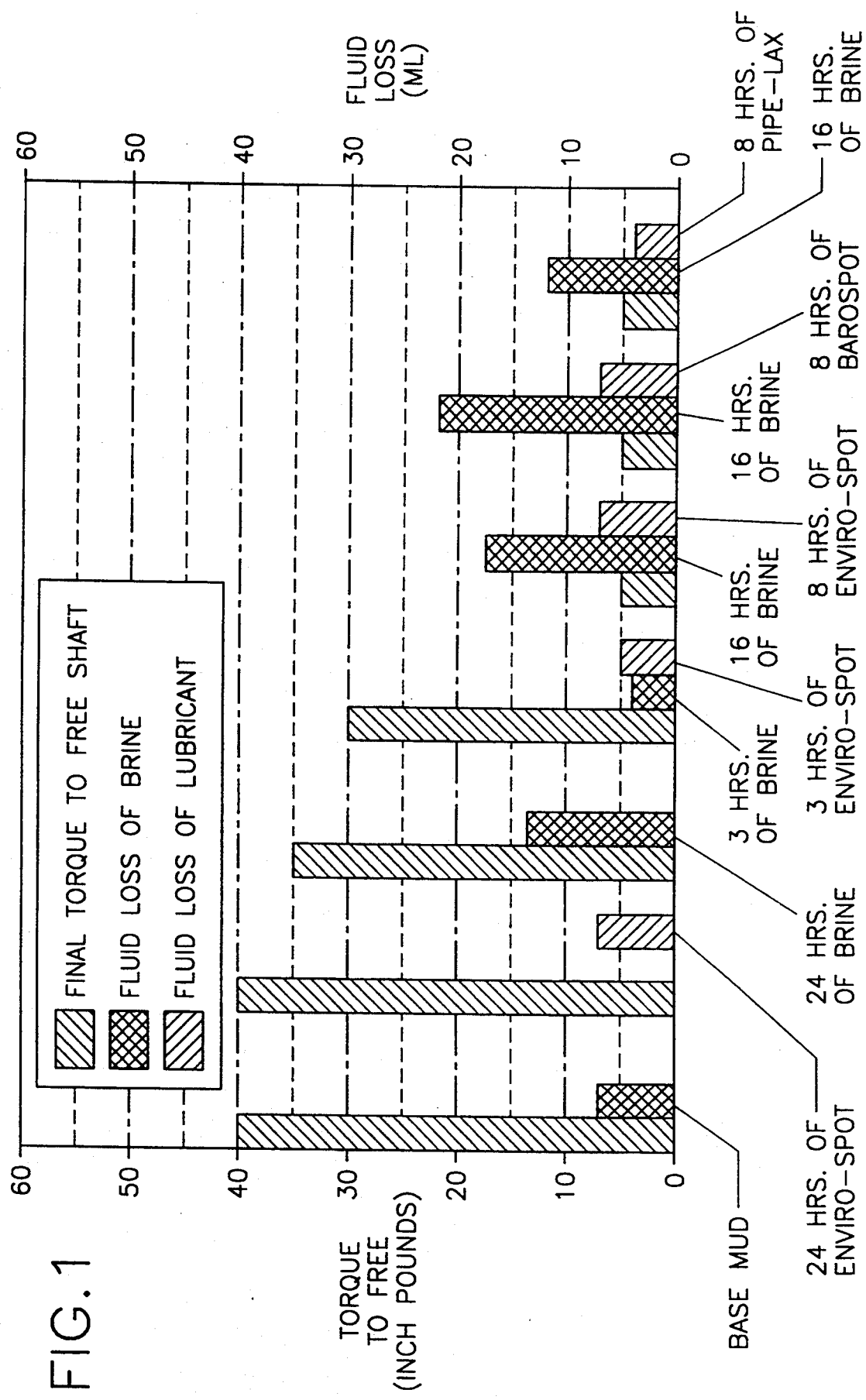
FIGS. 1-4 are each representative graphs illustrating laboratory tests of torque measurements and fluid loss measurements as functions of sequentially soaking drilling fluid filter cakes with clear brines and conventional spotting fluids.

While the invention will be described in connection with a presently preferred embodiment, it will be understood that it is not intended to limit the invention to that embodiment. On the contrary, it is intended to cover all alternatives, modifications and equivalents as may be included within the spirit of the invention as defined in the appended claims.

DETAILED DESCRIPTION OF THE PREFERRED EMBODIMENT

Conventional tests for measuring fluid loss rates indicate that, quite often, environmentally-safe compounds exhibit the slower fluid loss rates. Slower fluid loss rates, i.e., the filtration of the fluid through the filter cake, are associated with a failure of the spotting fluid to free up the differentially stuck pipe. A test generally known in the industry is the so-called "Torque-To-Free" test in which a STICK-O-METER is used to measure the torque required to free a shaft in the medium as a function of time. Such a test, measuring the torque and the filtration rate, can be performed as follows:

Stick-O-Meter Test Procedure

1. Assemble differential sticking filter press with flat sticking disk and filter cake retention screen.
2. Add the drilling mud and filter at 100 psi until 15 ml of filtrate has been collected.
3. Place the lever bar across the rod connected to the flat sticking plate and add a 40 pound weight to the end of the lever bar.
4. Filter the mud at 100 psi to collect 3 to 5 ml of filtrate.
5. Step 1.
   a. Remove weight, pressure, and filter cap, then decant the drilling mud and add 75 ml of brine.
   b. Reassemble filter with weight and filter the brine for 16 hours at 100 psi. Record the amount of brine collected.
6. Step 2.
   a. Remove weight, pressure and filter cap, then decant the brine and add 75 ml of spotting fluid.
   b. Reassemble the filter with weight and filter spotting fluid 8 hours at 100 psi. Record the amount of filtrate collected.
   c. After 8 hours of filtration, remove the pressure and weight, then measure the torque.

Because the environmentally acceptable oils have slow filtration rates through bentonite base filter cakes, it was decided to run laboratory tests to determine if torque could be reduced by adding brines ahead of the conventional spotting fluids. It was felt that, perhaps, the brines would destroy the bentonite based filter cakes deposited by water base drilling muds. This would possibly break down the filter cake and allow the conventional spotting fluids to reach and lubricate the drill string. A 14.2 lb/gal calcium bromide/calcium chloride blended brine was chosen to be used in the tests. It was felt that a 14.2 lb/gal calcium bromide brine could be easily stored and could be weighted with sack calcium chloride bromide when needed.

If the Stick-O-Meter test equipment is not available, the test equipment referenced above in the SPE Paper No. 22550 can be used to test the various spotting fluids.

Conclusions

1. Very low torques were observed in Stick-O-Meter tests when filter cakes deposited by freshwater bentonite muds were exposed to the spotting fluid in a two step procedure. The procedure consists of first adding a 14.5 lb/gas calcium bromide/calcium chloride brine and then adding the standard spotting fluid.

2. Exposure time to the brines was critical in the tests. In the early tests, 3 hours of soak with the brine was inadequate. 16 hours works quite well, but there was no data on soaking with the brine between 3 and 16 hours. Generally, only the fluids exposed to 16 hours of brine and 8 hours to the conventional spot gave low torque readings.

3. Several brine-ester blends tested (not illustrated) showed that the torques observed after 24 hours exposure to the brine-vegetable oil ester blends was lower than the torque seen by the brine alone. However, the lowest torque observed in all of the early tests was that seen for the two step procedure, i.e., a spotting of the clear brine for preferably at least 16 hours followed by the spotting of a conventional spotting fluid.

FIG. 1 shows a comparison in the early tests of filtration rates and "torque-to-free" measurements for the base drilling fluid above, the conventional spotting fluid (ENVIRO-SPOT) alone, the clear brine alone, and the 2-step spotting process involving first the clear brine, followed by the conventional spotting fluid, for the following time durations:

a) 3 hours of brine, 3 hours of ENVIRO-SPOT.
b) 16 hours of brine, 8 hours of ENVIRO-SPOT.
c) 16 hours of brine, 8 hours of BAROSPOT.
d) 16 hours of brine, 8 hours of PIPE-LAX.

FIG. 1 shows that even though the brine increased the filter loss, the torque-to-free remained high. Also, FIG. 1 presents the torque and fluid loss data for the two step spotting fluid tests. It was observed, that all the spotting fluids tested (ENVIROSPOT, BAROSPOT, and PIPE-LAX) that failed to reduce torque in previous tests, i.e., without the initial spot of clear brine, reduced the torque to 5 inch pounds in the two step tests.

Clear brines as used for the initial spotting fluid in accord with the present invention, tend to migrate into and contaminate the drilling fluid in the annulus of the borehole surrounding the drill string, especially should the density of the clear brine not exactly match the density of the drilling fluid. To minimize the contamination of the drilling fluid, it is considered desirable to minimize the soaking time of the clear brine in the stuck region of the pipe. In short, one would prefer to soak the filter cake with clear brine just long enough, but no longer.

Those skilled in the art will recognize that the clear brines can be weighted, if desired, with barite or attapulgite to increase the density up to about 17 ppg, but that the addition of the weighting solids may (or may not) adversely affect the release times of stuck pipe by plugging or sealing cracks in the filter cake.

Subsequent tests to those depicted in FIG. 1 were run because of not knowing the effect of soaking the filter cake between the 3 hour clear brine soak (which essentially failed) and the 16 hour clear brine soak which performed quite well in conjunction with the second spot, conventional spotting fluids.

Figure 2:
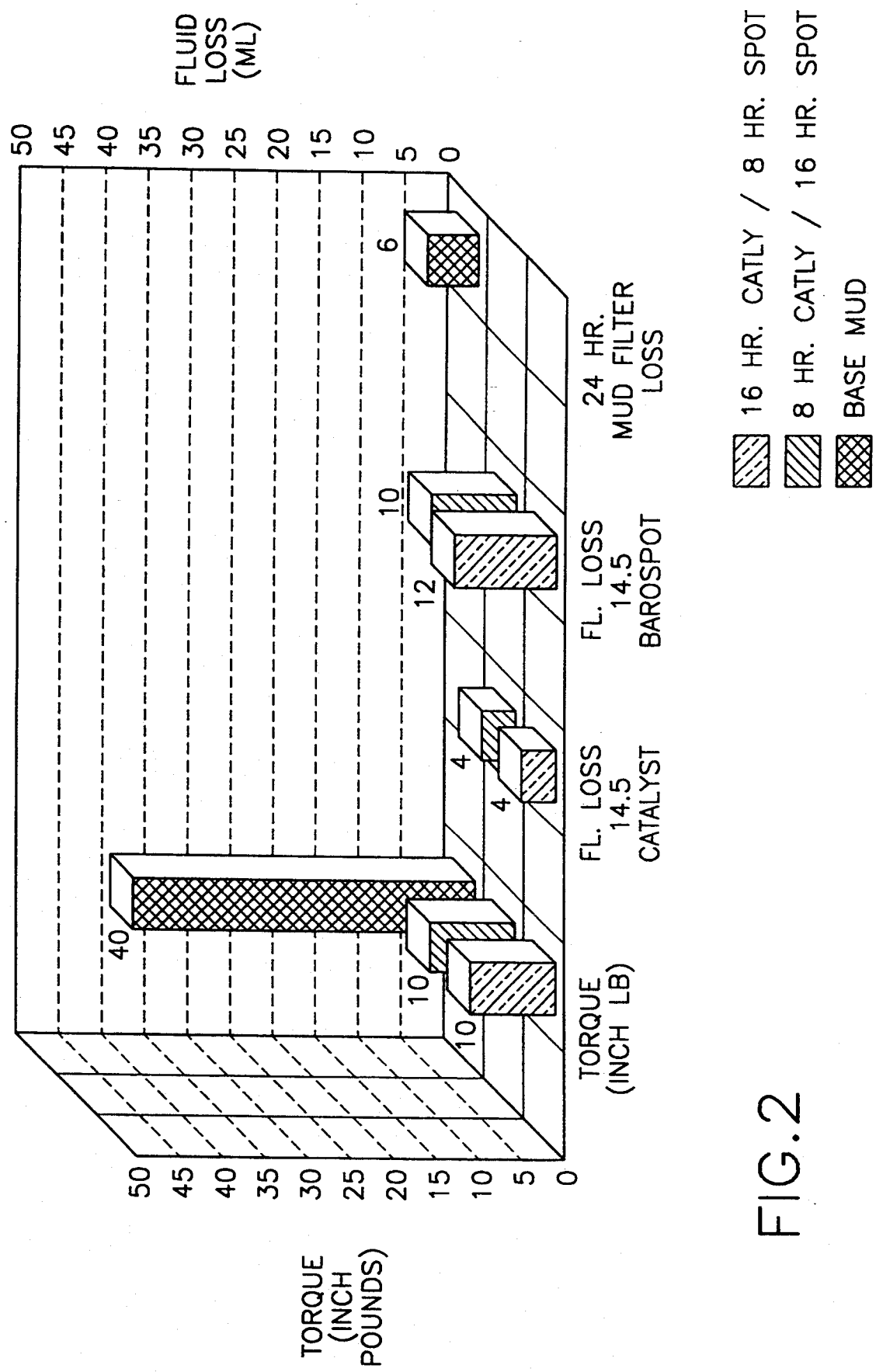

In later tests, FIG. 2 depicts a comparison of a 16 hour spot of the clear brine (referred to as a catalyst in the drawing) soaking a 14.0 ppg seawater/lignosulfonate filter cake, followed by an 8 hour soak with BAROSPOT, against an 8 hour clear brine soak followed by a 16 hour BAROSPOT soak. The torque-to-free results were identical (10 inch pounds), indicating that a soak of about 8 hours of clear brine prior to the second spot of a conventional spotting fluid should free the stuck pipe.

Figure 3:
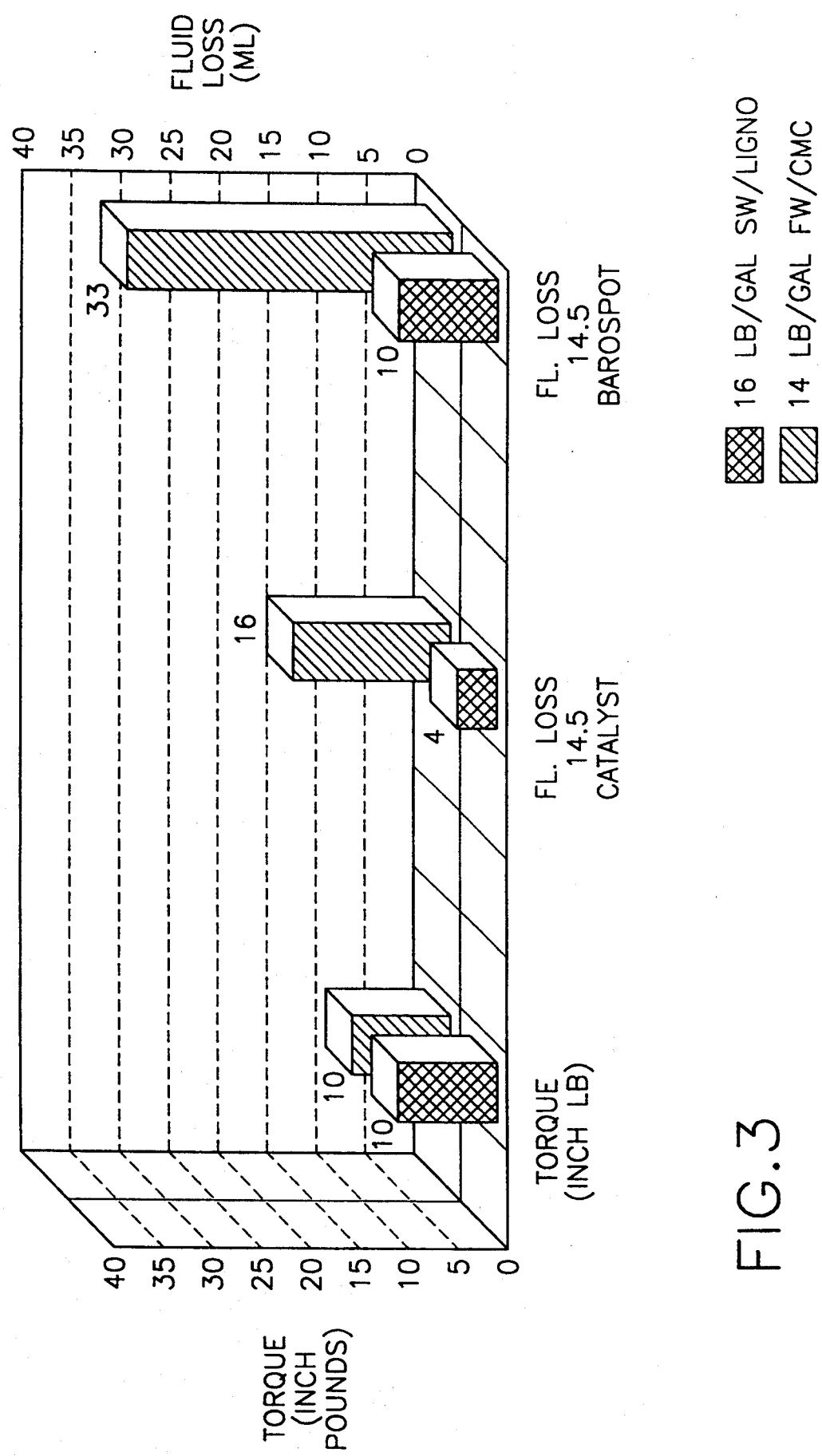
Figure 4:
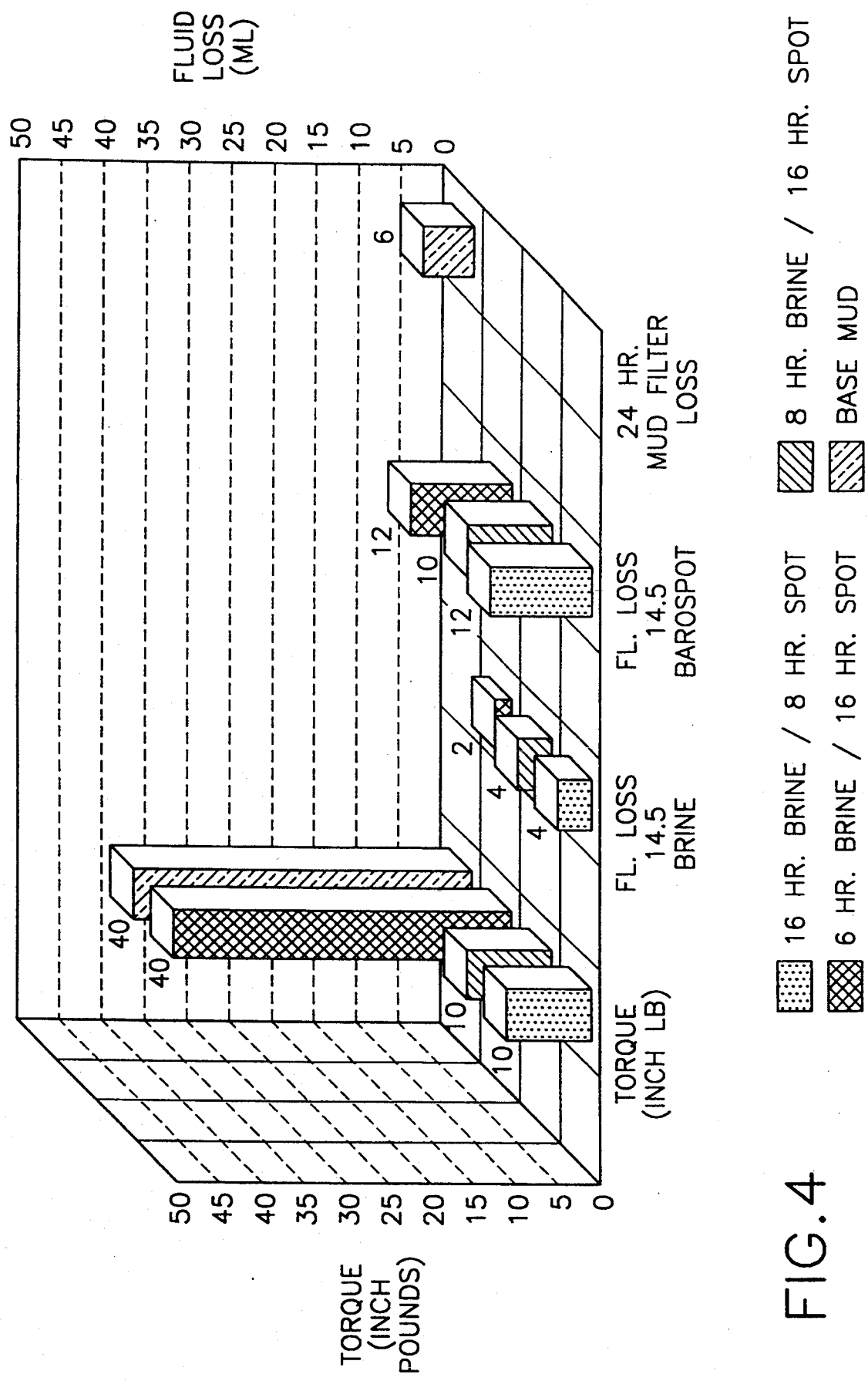

It was also considered that a 16.0 ppg seawater/lignosulfonate drilling fluid filter cake might react differently to the clear brine soak than, for example, a 14 ppg freshwater/carboxymethylcellulose (CMC) drilling fluid filter cake. FIG. 3 compares an 8 hour clear brine soak (14.5 ppg) for each of the two filter cakes. Although the fluid loss during both the clear brine soak and the 14.5 ppg BAROSPOT soak was much greater for the CMC filter cake than for the lignosulfonate filter cake, the torque-to-free readings were identical (10 inch pounds) indicating that a clear brine soak of about 8 hours is adequate to free the stuck pipe in two different types of filter cakes.

Out of an abundance of caution, a final test was conducted to determine if the filter cake could be soaked for 6 hours with the clear brine, followed by a 16 hour spot of BAROSPOT, and compared with a repeat of the 8 hour and 16 hour clear brine spotting fluids (followed by 16 hour and 8 hour BAROSPOT spotting, respectively). The 6 hour brine spot did not work, thus confirming the apparent need to first soak the filter cake with about at least an 8 hour soak with the clear brine fluid, followed by the spotting of a conventional spotting fluid.

Thus, it was concluded that in field operations to free stuck pipe, the first spotting pill should be of clear brine for at least about 8 hours, followed by a second spotting of conventional spotting fluid for perhaps 8 hours or more. If need be, based upon field experience, the clear brine can be spotted for more than 8 hours, followed by the conventional spotting fluid spot for an indefinite period of time until the pipe is freed.

The invention thus contemplates the following procedure, wherein "Spot 1" is the clear brine and "Spot 2" is the conventional spotting fluid, for example, BAROSPOT, ENVIRO-SPOT, PETROFREE, PIPE-LAX, COASTAL-SPOT, COASTALUBE, CESCO A-25 SPOT, VL-250, KOPLUS LL, TERPENE or the like, or may even be one of the less environmentally-friendly spotting fluids such as diesel oil, asphalt, mineral oil or the like if conditions permit. The conventional spotting fluid, in addition to those named, can be any fluid generally characterized as a wetting agent, a surfactant or a lubricant.

| Recommended Spotting Procedure |
| --- |
| 1. DENSITY |
| Density of spots to equal density of mud. Spot I brine density can vary up to about 15 ppg with combinations of calcium chloride or calcium bromide, or heavier if zinc bromide can be used. If density decrease is required, fresh water would be utilized. Spot II can be any conventional spotting fluid. |
| 2. VOLUMES |
| SPOT I |
| A. Minimum of 50 bbls |
| B. Minimum to cover collars |
| SPOT II |
| C. Minimum of 100 bbls |
| 3. DISPLACEMENT |
| A. SPOT I to be mixed in slugging pit and displaced into drill string at normal pumping rate. |
| B. SPOT II to be mixed in slugging pit and displaced into drill string at normal pumping rate. |
| C. SPOT II should be pumped from slugging pit until SPOT I clears bit and 8 bbls of SPOT I remain in drill string. If drill string capacities are greater than volumes of SPOT I and SPOT II, drilling fluid will be used in chasing SPOT II. |
| 4. SOAK TIMES |

-continued

Recommended Spotting Procedure

A. Circulation to be broken each hour (one bbl) until SPOT I is out of drill string. The estimated exposure time of SPOT I is preferably a minimum of 8 hours.
B. 85 bbls of SPOT II to be pumped into annulus at slowest rate possible. 15 bbls of SPOT II to be left in drill string.
C. Break circulation every hour and pump 1-2 bbls.
D. After pipe becomes free, pump pills out of hole at normal pump rate. When pills and interfaces reach surface, discard fluids. Circulate and condition mud.

Clear brines have been used for years as completion and workover fluids in the oil and gas industry. Typical of such fluids are calcium chloride, calcium bromides, zinc bromide and mixtures or blends thereof. Such brines are essentially solids-free, have divalent cations and can be blended into clear brines having densities ranging from 11.6 pounds per gal (ppg) for $CaCl_2$, up to 19.2 ppg for a blend of $CaCl_2/CaBr_2/ZnBr_2$, or up to 20.2 ppg for a blend of $CaBr_2/ZnBr_2$. Generally, the corrosion rate increases with brine density and temperature, with zinc bromide being the most dense and most corrosive of the commonly used clear brines.

Because the use of Zinc Bromide may create a corrosion, safety or environmental problem, the present invention finds much greater utility when the requisite density of the clear brine does not exceed a density of about 15.4 ppg which can be achieved with a blend of $CaCl_2/CaBr_2$.

Although such clear brines are commercially available as fluids, $CaCl_2$, $CaBr_2$ and $ZnBr_2$ are each available in dry form, either as powder, crystals, granules, lumps or flakes, are each soluble in water, and can be mixed with water to form the clear brine suitable for practicing the invention. The density can be altered up or down merely by adding either dry salt or water, respectively.

The theory of operation, i.e., the reason why the sequential spotting of clear brine and a conventional spotting fluid frees stuck pipe is not completely understood. However, it is now clear that the method does provide a vastly improved method, and a new and improved combination of materials for freeing a differentially stuck pipe in an oil and gas well.

We claim:
1. A method for releasing stuck pipe in a well bore comprising:
   pumping a first, clear brine spotting fluid into the stuck region of the pipe;
   allowing the clear brine to soak in place in the stuck region for about at least eight hours;
   pumping a second spotting fluid having at least one component selected from the class of polyalphaolefins, glycerides, esters, fatty acids, citric acids, terpenes, diesel oil, gilsonite, asphalt and mineral oil into the stuck region at the pipe; and
   allowing the second spotting fluid to soak in place for about at least eight hours, or until the stuck pipe has been freed, whichever happens first, in the stuck region of the pipe.
2. A method of releasing stuck pipe in a well bore comprising:
   pumping a first clear brine spotting fluid into the stuck region of the pipe;
   allowing the clear brine to soak in place in the stuck region for about at least eight hours;
   pumping a second spotting fluid having at least one component selected from the class of wetting agents, surfactants and lubricating agents into the stuck region of the pipe; and
   allowing the second spotting fluid to soak in place for about at least eight hours, or until the stuck pipe has been freed, whichever happens first, in the stuck region of the pipe.
3. The method according to claim 2, wherein said clear brine comprises calcium chloride.
4. The method according to claim 2, wherein said clear brine comprises calcium bromide.
5. The method according to claim 2, wherein said clear brine comprises zinc bromide.
6. The method according to claim 2, wherein said clear brine is selected from the class of calcium chloride, calcium bromide, zinc bromide or mixtures thereof.
7. A new and improved combination of materials for freeing stuck pipe, comprising:
   a first spotting pill comprised of clear brine;
   a second spotting pill selected from the class of wetting agents, surfactants and lubricants, said second spotting pill being sequentially spaced from said first spotting pill in the stuck pipe.
8. The combination of materials according to claim 7, wherein said clear brine comprises calcium chloride.
9. The combination of materials according to claim 7, wherein said clear brine comprises calcium bromide.
10. The combination of materials according to claim 7, wherein said clear brine comprises zinc bromide.
11. The combination of materials according to claim 7, wherein said clear brine is selected from the class of calcium chloride, calcium bromide, zinc bromide or mixtures thereof.

* * * * *